US006668483B1

(12) United States Patent
Trivisani et al.

(10) Patent No.: US 6,668,483 B1
(45) Date of Patent: Dec. 30, 2003

(54) INSECT BAIT AND CONTROL SYSTEM

(76) Inventors: Scott Trivisani, 31 Magnolia Rd., Hewitt, NJ (US) 07421; Carla Lee Summer-Trivisani, 31 Magnolia Rd., Hewitt, NJ (US) 07421

( * ) Notice: Subject to any disclaimer, the term of this patent is extended or adjusted under 35 U.S.C. 154(b) by 0 days.

(21) Appl. No.: 09/939,873

(22) Filed: Aug. 27, 2001

(51) Int. Cl.[7] ............................ A01M 1/20; A01M 1/02
(52) U.S. Cl. ...................... 43/131; 43/132.1; 424/413
(58) Field of Search ................... 43/132.1, 131, 43/107, 124, 133; 514/557; 424/410, 411, 413, 409

(56) References Cited

U.S. PATENT DOCUMENTS

| | | | |
|---|---|---|---|
| 1,591,902 A | * 7/1926 | Weinberg | 43/124 |
| 1,635,739 A | * 7/1927 | Brewster | 40/316 |
| 1,635,750 A | * 7/1927 | Jenks | 40/316 |
| 1,822,098 A | * 9/1931 | Huntress | 428/378 |
| 1,954,795 A | * 4/1934 | Bernitz, Sr. | 43/108 |
| 1,982,304 A | * 11/1934 | Holden | 43/44.98 |
| 2,022,937 A | * 12/1935 | Kirkpatrick | 43/108 |
| 2,514,437 A | * 7/1950 | Bailhe | 33/713 |
| 2,602,233 A | * 7/1952 | Irving | 33/756 |
| 2,795,527 A | * 6/1957 | Gopp | 424/413 |
| 4,193,986 A | * 3/1980 | Cox | 424/411 |
| 4,228,614 A | * 10/1980 | Cardarelli | 43/131 |
| 4,321,854 A | * 3/1982 | Foote et al. | 43/44.98 |
| 4,363,798 A | * 12/1982 | D'Orazio | 424/84 |
| 4,625,474 A | * 12/1986 | Peacock et al. | 43/124 |
| 4,666,767 A | * 5/1987 | Von Kohorn et al. | 43/132.1 |
| 5,150,541 A | * 9/1992 | Foster et al. | 43/131 |
| 5,165,351 A | * 11/1992 | Billings | 47/56 |
| 5,342,618 A | * 8/1994 | Leonhardt et al. | 424/411 |
| 5,564,222 A | * 10/1996 | Brody | 43/132.1 |
| 5,589,390 A | * 12/1996 | Higuchi et al. | 43/132.1 |
| 5,698,191 A | * 12/1997 | Wiersma et al. | 424/413 |
| 5,901,496 A | * 5/1999 | Woodruff | 43/131 |
| 6,003,266 A | * 12/1999 | Woodruff | 43/131 |
| 6,004,572 A | * 12/1999 | Harvan et al. | 424/409 |

(List continued on next page.)

FOREIGN PATENT DOCUMENTS

| | | | |
|---|---|---|---|
| EP | 128825 A1 | * 12/1984 | A01M/21/04 |
| FR | 60503 B1 | * 11/1954 | 43/132.1 |
| FR | 1466303 B1 | * 12/1966 | 43/131 |
| JP | 06022670 A | * 2/1994 | A01M/1/02 |
| JP | 7-308131 B1 | * 11/1995 | |
| JP | 2000-106804 B1 | * 4/2000 | |
| JP | 2000-333583 B1 | * 12/2000 | |
| JP | 2002-220306 B1 | * 8/2002 | |

OTHER PUBLICATIONS

McMaster–Carr Catalog, p. 967.
Aventis Environmental Science Termidor SC Literature.

*Primary Examiner*—Darren W. Ark
(74) *Attorney, Agent, or Firm*—Myers & Kaplan, LLC; Thomas R. Williamson, III; Joel D. Myers

(57) ABSTRACT

The present invention is a device for the elimination and control of termites and other insects, comprising a plurality of cellulose-containing strands and at least one pesticide-containing component interwoven with said strands to form a generally circular rope. In one embodiment, the pesticide-containing component may be comprised of a single extruded filament or a treated fiber. It may alternatively be comprised of a cellulosic tube containing the pesticide, or a cellulose paper upon which the pesticide is placed prior to being twisted into a strand. It can also be comprised of a group of fibers or filaments woven into a stand. Finally, the rope may incorporate an identifier strip and be covered by a mesh, which constricts upon removal, thus containing the spent material securely.

In application, the pesticide containing rope can be entrenched in the ground, placed in areas frequented by termites, or wound around trees to control wood-eating insects.

23 Claims, 3 Drawing Sheets

U.S. PATENT DOCUMENTS

| | | | |
|---|---|---|---|
| 6,065,241 A | * | 5/2000 | Woodruff .................... 43/132.1 |
| 6,129,796 A | * | 10/2000 | Steinberg et al. ............. 156/64 |
| 6,131,330 A | * | 10/2000 | Brody ....................... 43/132.1 |
| 6,164,010 A | * | 12/2000 | Snell et al. ................ 43/132.1 |
| 6,286,247 B1 | * | 9/2001 | Brody ....................... 43/132.1 |
| 6,286,248 B1 | * | 9/2001 | Bryant et al. ................ 43/125 |
| 6,344,191 B2 | * | 2/2002 | Landolt et al. .............. 424/405 |
| 6,493,988 B1 | * | 12/2002 | Johnson ....................... 43/131 |
| 6,618,986 B2 | * | 9/2003 | Brody ....................... 43/132.1 |
| 2001/0033230 A1 | * | 10/2001 | Barber et al. .............. 43/132.1 |
| 2003/0167678 A1 | * | 9/2003 | Hunt et al. ................ 43/132.1 |
| 2003/0177689 A1 | * | 9/2003 | Su ............................. 43/131 |

* cited by examiner

INSECT BAIT AND CONTROL SYSTEM

CROSS-REFERENCES TO RELATED APPLICATIONS

Not Applicable

FEDERALLY SPONSORED RESEARCH

Not Applicable

SEQUENCE LISTING, TABLE OR COMPUTER PROGRAM

Not Applicable

FIELD OF THE INVENTION

This invention is an improved device and method for the control and elimination of termites and other insects, specifically using a pesticide in the form of a rope, which can be readily applied in areas where termites or other insects might frequent.

BACKGROUND OF THE INVENTION

Termites exist in various forms: Nymphs and adults. The adult forms are workers, soldiers and reproductives. Nymphs will develop into the adult form that is needed by the colony.

Workers, which do the greatest damage to wood, are the colony members that provide food for the others. They also build and perform any needed maintenance on the colony. Workers also care for the nymph termites until they become old enough to forage themselves. Both the nymphs and workers create wood damage, with the majority of damage being caused by the workers. Soldiers function only to protect the colony. Reproductives, kings and queens, function to grow, extend and sustain the colony size.

Termites and other insects eat cellulosic material, of which woods are the prime source. Termites prefer fungus-infested wood. However, they will feed on any available wood even if it has not rotted or been damaged. In order to find food sources, termites tunnel through the soil. Most species of termites require a moist soil to survive. Areas where moisture collects near wood, such as woodpiles and old dead tree stumps are prime areas for feeding. Anywhere wood is in contact with soil, or where it is frequently wet, would be target areas that termites choose for food.

Some of the types of termites found in the United States are subterranean termites, Formosan termites and dry wood termites.

Subterranean species of termites live at depths up to about 20 feet below surface and will typically be dispersed throughout the soil around a building. Colonies may contain millions of termites.

Formosan termites can infest by air, and the only effective method of treatment is by poisoning the food source.

Dry wood termites need very little water to survive and do not need to remain in the soil to obtain moisture. The best methods of controlling dry wood termites are prevention of entry to the source areas and poisoning the food source itself, such as by treating wood with termiticide.

Termites digest the cellulose that they eat through the help of organisms, particularly bacteria, within their digestive system. Thus, by killing the organisms that aid digestion, the termite itself will die. Materials that are toxic to the digestive organisms include boric acid, borates and other materials. Foraging termites locate a food source, eat and return with food to feed the other termites and to inform other workers of the food source. Thus, killing a termite quickly is not usually desirable. It is better to allow them to return to the colony to communicate the location of the food source and to feed other termites with the slow-acting toxins that they have brought back in their digestive system.

Bait shyness occurs when termites locate a food source but early scouts die from it. If the food is satisfactory and a message is returned to the colony, many more termites will be attracted.

Termites are cannibals and thus will spread the toxin by eating the dead termites in the colony. In this fashion an entire colony can be decimated, if not eliminated.

Pesticides which are used to control termites include, but are not limited to, borate salts, such as disodium octaborate tetrahydrate and disodium tetraborate decahydrate, boric acid, borides, glycol borate mixtures, sulfluramid, and fipronil, as sold by Aventis Environmental Science USA, LP, Montvale, N.J.

In treating a structure for termites, the areas treated typically include roofs, roof trim, soffits, attics, floor, flooring, foundations, window frames, door frames, between wood joints, cavities in walls, voids between studs, eaves, sills and sill plates, floor joists, girders, sub-floors, block voids, interior and exterior sheathing, wood near plumbing and electrical entries (termites can enter a home through an opening as small as $\frac{1}{32}$ of an inch), carpet backing, basements, crawl spaces, garages, porches, decks, fences, pilings, piers, utility poles, other exterior areas such as steps, and garden landscaping items such as logs, posts and rail-road ties. In sum, anywhere there is wood needs to be treated to prevent access and anything made of wood should be treated to avoid destruction.

Many other insects that eat wood exist. Often wholesale destruction of growing trees can take place. It is necessary to apply a pesticide material to the tree in order to kill these insects.

DESCRIPTION OF RELATED ART

Various methods exist for control of termites and various pesticides exist to effect these methods. Application of liquids may be achieved by brushing, spraying, injecting, pouring, flowing through a tube, or such like. Powder may be applied by injecting, dusting or similar. Foams may be injected or sprayed into cavity areas. Liquids and powders lack containment and may contaminate the environment. Liquids, powders and foams all suffer from being difficult to remove.

The creation of a toxic barrier is desirable, but treatment of the potential food source area is also often needed. By providing a barrier, it may not be necessary to treat all potential wood areas within a home. This would apply in particular to subterranean (excluding Formosan) termites that are unable to bypass the barrier and must contact the barrier in order to get to the food source. However, prior art barriers are not continuous and have gaps in their coverage area.

Fumigation is also used to effectively eliminate termites. However, after the elimination, future control is needed.

Following are some specific prior art examples:

U.S. Pat. No. 4,363,798 to D'Orazio (1982) describes termite bait that utilizes brown rot fungus as an attractant and boron compounds in an amount to kill termites without creating bait shyness.

One method (U.S. Pat. No. 5,564,222 to Brody (1996)), which is thought to be the closest prior art, utilizes stakes that have been treated with a termiticide and then are driven into the ground at regularly spaced intervals. This method of application allows for gaps in coverage and in irregularly spaced intervals and requires the handling of many discrete components. Additionally, when it is desirable to remove the devices, they must be located and often will have degraded in composition, thus making removal difficult.

Another method (U.S. Pat. No. 4,625,474 to Peacock, deceased, et al. (1986)) utilizes installation of a tube in the ground area to be treated. Pesticide is then pumped into this tube and exits through holes in the tube into the ground. This method does not contain the pesticide, but rather causes it to be released into the environment.

A third method (U.S. Pat. No. 5,901,496 to Woodruff (1999); U.S. Pat. No. 6,003,266 to Woodruff (1999); U.S. Pat. No. 6,065,241 to Woodruff (2000)), also utilizing a tube, controls the bait and pesticide by inserting it into the original tube through a second tube. This also suffers from a lack of containment, allowing pesticide to be released into the environment.

U.S. Pat. No. 5,150,541 to Foster et al. (1992) describes a mesh that encloses an insecticide. This mesh is used as a protective barrier to prevent other larger non-target creatures from coming in contact with the toxin. This mesh only serves as a fixed barrier and does not aid in the removal of the bait.

These prior devices and methods either are rather involved and thus costly in manufacture and/or operation, or are unsuitable for ease of removal and replacement. In field application, choices are limited, most notably for preventative applications.

Objects and Advantages

The present invention offers significant objects and advantages over the above prior art devices and methods.

Since the instant invention may be manufactured using rope-making equipment and thus can be made in continuous form, it has the benefit of low cost. Ropes are made from a number of strands helically laid around a central strand or core, or by twisting or braiding the strands. The strands that make up the rope, which are also formed by helical-laying, twisting or braiding, are made from a number of individual filaments or fibers. While the instant invention is preferably made by incorporating one or more strands that contain pesticide along with several strands which are cellulose-based, it would also be possible to weave an individual extruded, drawn or spun filament of a pesticide-containing matrix into the rope. In fact, the entire construction may be formed as a single filament, instead of as a rope, by a process such as extrusion. Extrusion would also allow, through coextrusion, the formation of a filament comprised of an inner core and an outer covering.

Because the present invention is a continuous article of manufacture, it may either be applied as such or cut onto suitable segments. When applied in continuous form, it can be applied by forming a trench, inserting the device into the trench and then covering over with soil. While many methods exist for doing this, this could well be accomplished by the apparatus detailed in U.S. Pat. No. 5,165,351 to Billings (1992), in which the rope might be fed in a manner similar to the installation of the seed tape.

Other types of termite control utilize stakes or bait stations driven vertically into the ground, or pesticide that is inserted into holes drilled in the ground. Since holes cannot be readily drilled horizontally, these methods are not useful in providing lateral barriers. While they could be readily inserted into trenches in the same fashion as the instant invention, their short lengths are not suitable to efficient installation. The instant invention thus serves essentially as a horizontal bait station. The instant invention thus overcomes the disadvantages of the prior art.

In being applied horizontally, the present invention can be used in multiple layers, which may be applied at different depths. In addition to the major advantage of being applied horizontally, the present invention can still be used in the conventional vertical application method, by cutting into strips and inserting vertically into holes in the ground.

The instant invention also readily conforms to the contour of the landscape, facilitating installation. It can be adjusted for climatic aspects, such as temperature and weather, for variations in terrain, and even for the type of termite or other insect, all by changing the make-up of the components of the rope.

While it is often necessary to eliminate an infestation of termites, it is much more desirable to prevent their damage in the first place. By incorporating the pesticide-rope into the construction of a building, very effective termite prevention may be accomplished. Small diameter ropes, made in the fashion of the instant invention, may be readily pressed into expansion joints or similar spaces in existing construction.

The instant invention can be used as a toxic barrier or to treat the food source area. It may also be utilized after fumigation to control future infestations.

Some insects that might be controlled or eliminated through the use of the instant invention are subterranean termites (reticultermes, heterotermes), Formosan termites (coptotermes), dampwood termites (zootermosis, neotermes), carpenter ants (camponotus), old house borers and long horn beetles (creamoycidae, hylotrupes).

Some materials are contact poisons; others may merely repel the termites or other insects. Either type may be incorporated into the device described and claimed herein. Binder, particularly cellulosic would be useful to contain the mixture for processing. An attractant, such as brown rot fungus might also be added.

It is desirable to control and reduce or eliminate the leaching of pesticide into the soil. Applications made in areas where moisture is not flowing will accomplish this. However, it is often necessary to place a barrier in an area where moisture penetrates.

By using the instant invention, the leaching is reduced because the pesticide is in the central core and is less likely to be contacted by free water. Incorporating other materials in the pesticide mix may also reduce leaching. These materials would be used to contain and in some cases partially encapsulate the pesticide, preventing leaching out.

A mesh may be used to cover the rope. This mesh would be most useful if it served a function to contain and allow removal of the rope for adjustment or at the end of the rope's useful life. This invention provides that, using a mesh that tightens around the rope, thus constricting and containing the components inside. By also using a mesh material that is hydrophobic, excess moisture will be prevented from entering the rope and leaching out the pesticide material, while still allowing moisture vapor to enter and provide an adequate level of wetness to be attractive to termites. The mesh also serves to allow handling with a minimum of protective equipment, since there would not be direct contact with the toxic component. This would also be especially true of the construction in which the cellulose-containing strands surround the central pesticide-containing core.

Markings to indicate length may also be added to the rope to denote intervals for cutting, thus also serving the purpose of metering the pesticide in a given area, since a given length will correspond to a given dosage. Differing applications may require differing quantities of toxin and this may be accomplished in various fashions, including by increasing the diameter of the termiticide-containing rope. Inventorying of the material will also be facilitated, as pieces will have their dosage readily calculable from their length and diameter. Any instrument suitable for cutting may be used.

As discussed earlier, there are other insects that destroy wood, often killing growing trees. Treatment to eliminate these wood-eating insects may be accomplished by wrapping the trees with the rope construction of the instant invention.

By reviewing and considering the drawings and descriptions further objects and advantages of the instant invention will be apparent.

BRIEF SUMMARY OF THE INVENTION

The present invention is a device for the elimination and control of termites and other insects, made from strands comprised of cellulose and pesticide-containing components, said termite bait and pesticide being woven into a rope and thus applied either as a continuous barrier or cut into sections to be placed where needed. It incorporates an identifier tag strip which may contain, among other things, the name of the toxin used, the manufacturing date and location, reference to the Material Safety Data Sheet safety categories, and so on.

Over the outside of the rope there is a hollow diamond braided covering mesh that is of an open weave allowing passage of termites. This type of weave has a property of constricting down to a narrower dimension when it is pulled, thus tightening over the rope. Thus, it will grasp the rope firmly for ease of removal. This mesh can also be made from a hydrophobic material to reduce or eliminate leaching of the toxin from the rope into the surrounding soil. Additionally, this mesh contains the pesticide rope and prevents it from falling into the surrounding area.

BRIEF DESCRIPTION OF THE SEVERAL VIEWS OF THE DRAWINGS

In the drawings which illustrate the embodiments presently contemplated for carrying out the present invention.

Reference Numerals in Drawings

Figure 1:
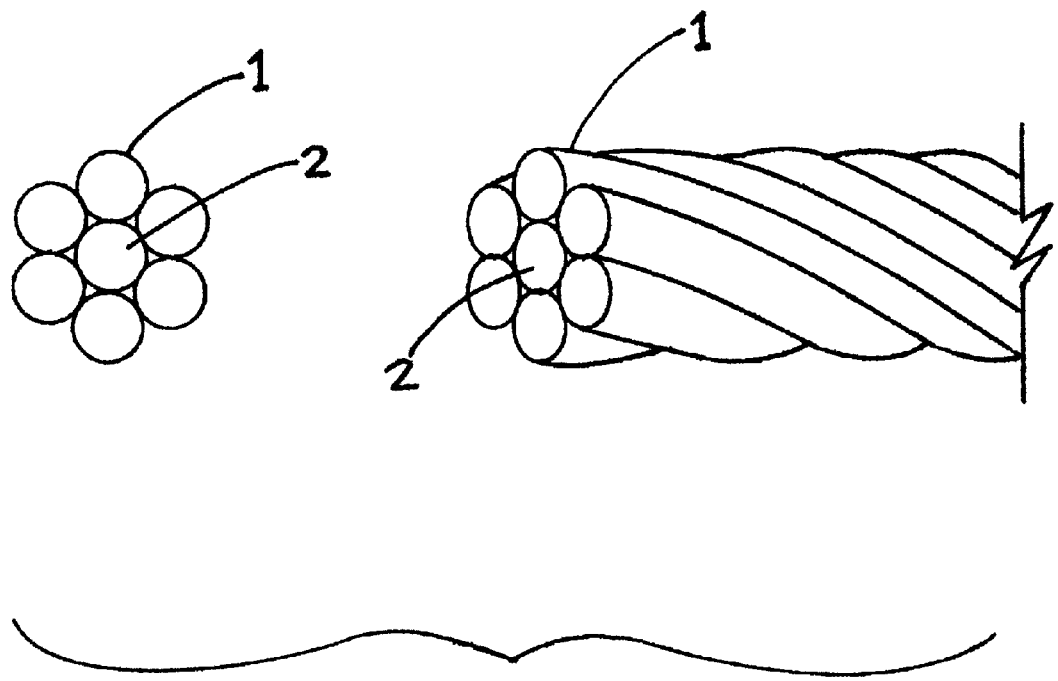
FIG. 1 illustrates the rope portion of the invention, which is comprised of cellulose-containing strands surrounding a central pesticide-containing component.

1. Cellulosic strand
2. Pesticide-containing component
3. Filaments containing pesticide
4. Pesticide powder twisted in paper
5. Pesticide powder or pellets
6. Cellulosic container spirally wrapped
7. Mesh (open)
8. Mesh (closed)
9. Identifier tag strip
10. Outer covering

DETAILED DESCRIPTION OF THE INVENTION

Preferred Embodiment

FIG. 1 shows a rope consisting of a plurality of cellulose-containing rope strands 1 helically would around a pesticide-containing strand or component 2. The strands 1 around the outside are made from a type of cellulose that termites prefer for food. These may be cellulose from wood pulp, cotton or similar and may be treated with an attractant for termites such as a medium containing brown rot fungus, which is known to be favored by termites.

The pesticide-containing central component 2 is comprised of a toxin that is lethal to termites and a bait food that is made from a form of cellulose that serves as food for termites, so that they will eat the toxin, once they eat through these outer strands. As they eat through the outer strands 1, they reach and begin to eat the inner pesticide-containing component 2 that contains the toxin.

Figure 2A:
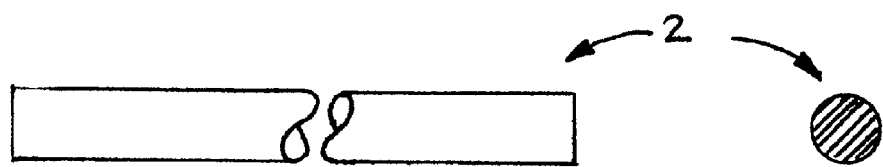
FIG. 2A depicts the central pesticide-containing component as a single extruded filament.
Figure 2B:
FIG. 2B shows the central pesticide-containing component comprised of helically-wound filaments or fibers, helically-wound in a fashion similar to the rope itself
Figure 2C:
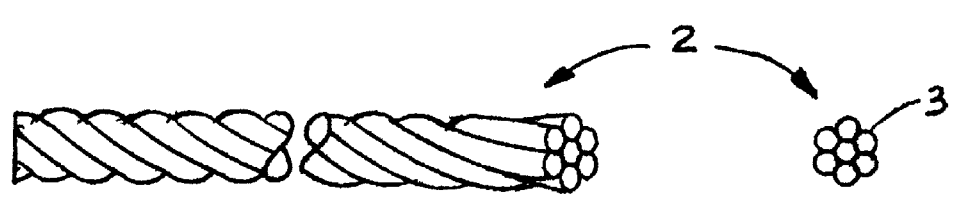
FIG. 2C illustrates the central pesticide-containing component comprised of a paper upon which the pesticide powder has been sprinkled, said paper then being twisted in the form typically used for making a firecracker fuse.
Figure 2D:
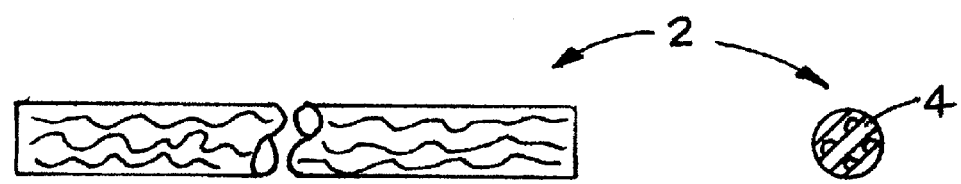
FIG. 2D shows the pesticide-containing powder or pellets within an outer wrap, which is wound in a spiral form and thus the overall construction makes up the central pesticide-containing component.

The preferred embodiment is comprised of strands 1 from FIG. 1 made from a type of cellulose that termites favor for food, such as from wood or cotton, combined with the pesticide-containing component 2, shown in FIG. 2D, being made as a container enclosing a toxic bait. In FIG. 2D, bait 5 is a toxic mixture, which may consist of boric acid or borate salts, or other termiticidal ingredients, along with binders, cellulosic food source and inert ingredients. Bait 5 is in solid form as a powder or pellets or similar, which is enclosed by a cellulose casing 6, spirally wrapped. This cellulose casing may include tissue paper and similar papers that would be desirable to termites. The principal advantage of this embodiment over the others shown below is that it maximizes the quantity of pesticide that can be delivered.

Figure 3:
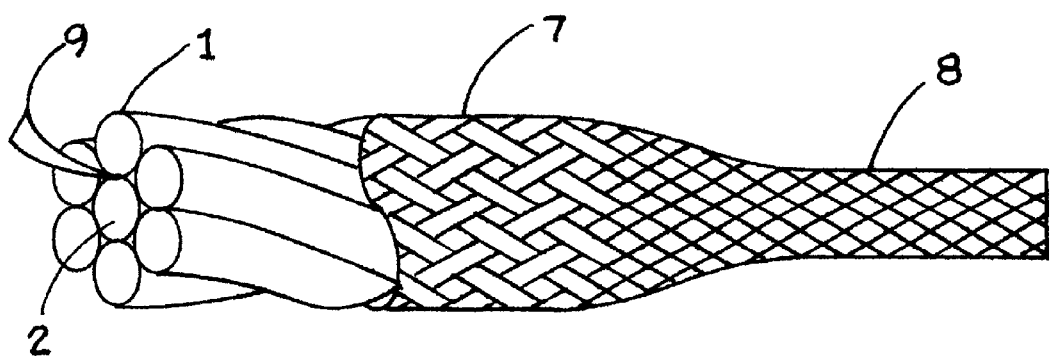
FIG. 3 illustrates the overall invention, comprising the rope formed as shown in FIG. 1, incorporating therein one of the central pesticide-containing components from FIG. 2, and being covered by a non-biodegradable mesh which is formed or placed over the rope to allow for later removal, and including an identifier strip incorporated into the device.

To complete the preferred embodiment, one must refer to FIG. 3, in which there are additional components. A loosely woven open mesh 7, such as a hollow diamond braided rope, as sold by McMaster-Carr Supply Company, Elmhurst, Ill., encloses the helically-wound rope bait. This mesh would typically be made from a non-edible, non-biodegradable polymer. Gaps in the mesh allow a termite to pass through and eat the rope and its toxic core. The mesh serves two purposes. It facilitates the removal of the eaten and decomposed rope by constricting down to a closed mesh 8, closing the gaps and tightening around the remaining rope when pulled from one end, in much the same way as 'Chinese finger cuffs' tighten around a finger. In this way complete removal can be accomplished, without leaving behind material from the rope or its toxic core, thus allowing a return of the surrounding area to an environmentally neutral state after removal.

The second benefit is that by use of a polymer that is hydrophobic, such as polytetrofluoroethylene or polypropylene, there will be elimination or substantial reduction of the leaching out of the toxin into the surrounding soil. Because of the open weave of the mesh, moisture vapor will still permeate the rope, facilitating the digestion by termites.

In addition, an identifier strip 9 may be woven into the rope to advise those who install, remove, or locate it by accident, of its purpose and nature.

Operation of the Preferred Embodiment

The instant invention is applied to the perimeter of a building requiring termite protection, against the foundation, below ground, approximately four to six inches deep. Termites are attracted to the rope's outer strands 1, eat through them, and are poisoned by the inner pesticide-containing component 2. Differing circumferences of rope can be used to meet different application parameters.

The outer set of cellulosic strands 1 is attractive to termites as a food source. Termites that encounter this will begin eating and send a message back to the colony that there is a food source. Since there is no toxin in this set of strands, the termites will not become 'bait shy' and more and more will gather to eat. Eventually, the inner pesticide-containing component 2 will be reached and ingested as food. Termiticides, such as borate salts, including disodium octaborate tetrahydrate and disodium tetraborate decahydrate, which would be used in this central pesticide-containing component 2, are known to cause the elimination of bacteria necessary to the digestion of food by termites. Termites that eat this pesticide-containing component 2 will die, leading to the reduction of termites by shrinking the colony or eliminating it. Other termiticides may also be used, such as borides, glycol borate mixtures, sulfluramids, or fipronil. Some of these pesticides may require only contact to kill the insect.

Moisture is provided by water vapor migrating through the open mesh 7 to the rope. However, if the open mesh 7 is made of a material that is hydrophobic, free water will not be available to leach out the toxin into the surrounding soil.

The mesh, which is non-biodegradable, serves as a supporting matrix for the containment and removal of the instant termite-controlling device from the ground after the end of its useful life or for temporary removal of a portion of the device for observation of whether there are termites in the area. This removal may be accomplished by grasping and pulling on the open mesh 7. This open mesh 7 then constricts down tightly around the remaining rope material forming a closed mesh 8, containing it for complete removal. The open mesh 7 adequately permits the termites to enter and feed, but since it is not eaten and does not degrade, it remains coherent and can be removed, pulling the cellulose/pesticide rope with it.

An identifier strip 9 is incorporated into the rope, which strip provides information related to the manufacture of the rope, including such information as the Material Safety Data Sheet that is applicable thereto.

By utilizing a continuous rope as the termite control device, an unbroken perimeter can be economically established around a building. The contour of the land to be treated can readily be followed due to the flexible nature of the rope. This overcomes the disadvantages of other discrete component methods, which cover only certain areas and have gaps between them. Environmental impact is minimized by the rope construction with a mesh over it, which also aids in installation and removal.

The pesticide-containing rope may also be used to control other wood-eating insects and prevent damage to trees, by wrapping the rope around the trunk and limbs of the trees. In this fashion, insects that eat the rope will die, the population will be reduced, and the trees will survive.

Description—Additional Embodiment

Other central core pesticide-containing components 2 may be used to make up the pesticide system of FIG. 1. In FIG. 2A, pesticide-containing component 2 is a solid filament or fiber extruded or similarly fashioned into a cohesive unit. This extruded component contains pesticide, binder, inert components and food blended together.

Operation—Additional Embodiment

This central core pesticide-containing component 2 which is a single unit, and not made from individual strands, can be readily made by extrusion. Because it is a single homogeneous component, and denser than the other embodiments, it would be most suited to applications where very slow eating by the termites is desired.

Description—Additional Embodiment

FIG. 2B depicts pesticide-containing component 2 composed of filaments or fibers 3 wound similarly to the overall invention; that is, in which there is a central filament or fiber 3 with outer filaments or fibers 3 helically-wound around it. The filaments or fibers 3 may all be of the same material or may be made from differing materials. In one embodiment, they may be fibers treated with a boric acid, borate salt or other solution. In another example, the strands may be filaments extruded from a matrix containing a binder, a food source and inert components, much as that in FIG. 2A, but thinner in dimension.

Operation—Additional Embodiment

This embodiment allows ease of manufacture of the rope, since it can be substantially fashioned on rope-making equipment. The only aspect that would require additional steps would be the pretreatment of a single filament or fiber 3 material with a toxin. Once done, it would be woven along with the other filaments and fibers to form the central core pesticide-containing component 2. Then the central core pesticide-containing component 2 would be formed into the rope, along with cellulosic strands 1. An additional aspect is that all the filaments or fibers 3 used to make up the central core pesticide-containing component 2 might be treated with toxin, or treated with different toxins.

Description—Additional Embodiment

FIG. 2C is an example of differing construction of the central pesticide-containing component 2. In this embodiment, the central pesticide-containing component 2 is formed by sprinkling a pesticide 4 on a cellulosic paper 5 and then twisting the paper in the same fashion as a fuse is made for a firecracker. In this, the pesticide 4 is loosely contained by the paper 5 and is reasonably uniformly distributed.

Operation—Additional Embodiment

This embodiment functions in the same fashion as those above, both providing a pesticide 4 and a food combination, in this case paper 5, in the central pesticide-containing component 2. Because of its simplicity, it would be a low cost method of manufacture.

Description—Additional Embodiment

Figure 4:
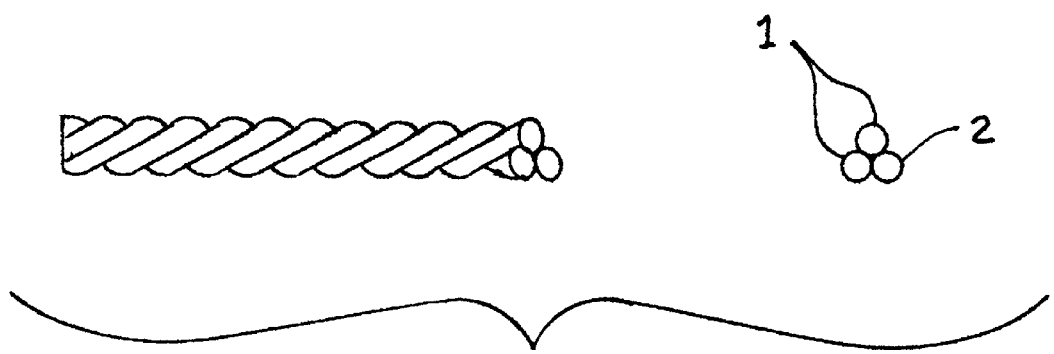
FIG. 4 shows an alternative embodiment in which the cellulose-containing strand or strands are twisted into a rope with the pesticide-containing strand, in contrast to surrounding it.

FIG. 4 shows a different form for the assembly of the rope device. In this case, a plurality of strands 1 are twisted together with the pesticide-containing component 2 to form a rope. In this form, there may be also only a single cellulosic strand 1 and a single pesticide-containing component 2.

Operation—Additional Embodiment

In this form, termites will begin ingesting pesticide from the start and 'bait shyness' may result. This form would be most applicable where it is desirable to eliminate termites rapidly and also to cause them to look elsewhere for food.

Description—Additional Embodiment

Figure 5:
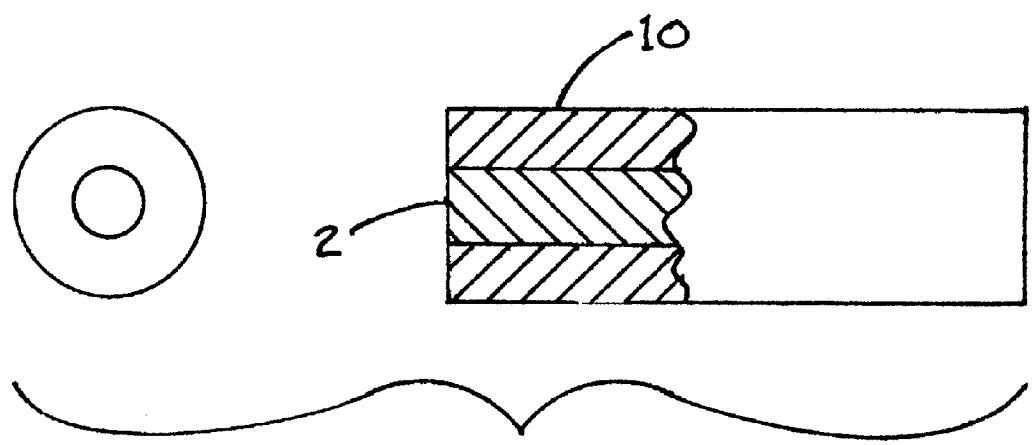
FIG. 5 depicts an alternative embodiment in which the entire construction is made from an extruded filament, having an inner pesticide-containing core and outer cellulose-containing covering.

In FIG. 5, which depicts an additional embodiment, the pesticide-containing component 2 may be formed from a single fiber or filament that has an outer covering 10 of cellulose-containing material. This single fiber or filament may be made by any process suitable for forming such fibers or filaments, including, but not limited to an extrusion or co-extrusion process. Additionally, the outer covering 10 may include pesticide in order to speed the elimination of the target insect. In this embodiment, the single fiber or filament may also have a mesh covering in order to contain the material as it is eaten or decomposes.

Operation—Additional Embodiment

The construction that is formed in this embodiment functions in the same or similar manner to those described above. Additionally, this construction is particularly suited to providing slower release of the toxin, since it will not be as easily consumed as less dense fibers.

Conclusions, Ramifications, and Scope

Ropes may be manufactured with different weaves, such as twisting differing number of components. Differing combinations of cellulose-containing strands 1 and toxic components 2 might be used other than a single toxic component 2 with a plurality of cellulosic strands 1.

Although the above description provides specific details and examples of the preferred embodiments of the invention, it should not be construed to limit the scope of the invention.

The scope of the invention should be determined from the claims below and their legal equivalents, rather than from the specific examples and details given.

We claim:

1. A device in the form of a rope comprising a plurality of pesticide-free cellulose-containing strands and at least one pesticide-containing core component, said plurality of pesticide-free cellulose-containing strands laid helically around said at least one pesticide-containing core component to form a generally circular rope.

2. The device in the form of a rope as set forth in claim 1, wherein said at least one pesticide-containing core component is comprised of at least one pesticide, at least one binder, at least one filler and a support matrix.

3. The device in the form of a rope of claim 1, wherein said plurality of pesticide-free cellulose-containing strands comprises a type of cellulose that is favored as a food by termites.

4. The device in the form of a rope of claim 1, wherein said at least one pesticide-containing core component is comprised of strands treated with a pesticide selected from the group consisting of borate salts, borides, glycol-borate mixtures, sulfluramids, and fipronil.

5. The device in the form of a rope of claim 4, wherein said borate salts are selected from the group consisting of disodium octaborate tetrahydrate and disodium tetraborate decahydrate.

6. The device in the form of a rope of claim 1, further including a diamond-braided mesh covering thereon.

7. The device in the form of a rope as set forth in claim 6, wherein said diamond-braided mesh covering becomes more and more constricted when pulled from one end, tightly binding the rope contained within.

8. The device in the form of a rope of claim 7, further characterized in that said diamond-braided mesh covering comprises a hollow diamond-braided rope.

9. The device in the form of a rope of claim 6, wherein said diamond-braided mesh covering is comprised of hydrophobic material.

10. The device in the form of a rope of claim 1, further incorporating therein an identifier strip.

11. The device in the form of a rope of claim 1, wherein said rope has markings thereon for measurement of length.

12. The device in the form of a rope as set forth in claim 1, wherein said at least one pesticide-containing core component is comprised of pesticide-containing filaments or fibers.

13. The device in the form of a rope of claim 12, further characterized in that said pesticide-containing filaments or fibers are helically-wound around said at least one pesticide-containing core component which comprises a central pesticide-containing filament or fiber.

14. The device in the form of a rope of claim 1, wherein said at least one pesticide-containing core component comprises a pesticide material contained within a spirally-wrapped cellulosic ribbon, which ribbon forms a cylinder.

15. The device in the form of a rope of claim 1, wherein said at least one pesticide-containing core component comprises a single filament of extruded pesticide-containing material.

16. The device in the form of a rope of claim 1, wherein said at least one oesticide-containing core component comprises pesticide material sprinkled onto a cellulosic paper, which paper is then twisted in the form of a strand, said strand thus containing said pesticide material.

17. A method for controlling termites comprising the steps of:
   a) taking a plurality of pesticide-free cellulose-containing strands and at least one pesticide-containing component and combining said strands and component into a rope, and
   b) placing said rope in the ground around a building in a manner which forms an unbroken perimeter around the building,
      whereby said rope thus serves to eliminate and control termites.

18. The method for controlling termites of claim 17, wherein said plurality of pesticide-free cellulose-containing strands and said at least one pesticide-containing component are twisted together.

19. The method for controlling termites of claim 17, wherein said plurality of pesticide-free cellulose-containing strands and said at least one pesticide-containing component are braided together.

20. The method for controlling termites of claim 17, wherein said rope is placed at a depth of approximately between four to six inches below the surface of the ground.

21. The method for controlling termites of claim 17, wherein said rope is placed proximate the foundation of the building.

22. A method for controlling termites comprising the steps of:
   a) taking a plurality of pesticide-free cellulose-containing strands and at least one pesticide-containing component and combining said strands and component into a rope by surrounding said at least one pesticide-containing component with said plurality of pesticide-free cellulose-containing strands;
   b) covering said rope with a diamond-braided-mesh; and
   c) placing said rope in the ground,
      whereby said rope thus serves to eliminate and control termites.

23. A method for controlling wood-eating insects comprising the steps of:
   a) taking a plurality of pesticide-free cellulose-containing strands and at least one pesticide-containing component and combining said strands and component into a rope by surrounding said at least one pesticide-containing component with said plurality of pesticide-free cellulose-containing strands;
   b) covering said rope with a diamond-braided mesh; and
   c) winding said rope around the trunk and limbs of trees,
      whereby said rope serves to eliminate and control woodeating insects.

* * * * *

UNITED STATES PATENT AND TRADEMARK OFFICE
CERTIFICATE OF CORRECTION

PATENT NO.     : 6,668,483 B1                                    Page 1 of 1
DATED          : December 30, 2003
INVENTOR(S)    : Trivisani et al.

It is certified that error appears in the above-identified patent and that said Letters Patent is hereby corrected as shown below:

Title page,
Item [76], Inventor, delete "Summer" and replace with -- Sumner --

Signed and Sealed this

Twentieth Day of July, 2004

JON W. DUDAS
*Acting Director of the United States Patent and Trademark Office*